Feb. 9, 1971    S. MINUNNO    3,561,200
POWER OPERATED GRASS TRIMMER
Filed June 11, 1968    5 Sheets-Sheet 1

INVENTOR
SAVERIO MINUNNO
BY Polachek & Saulsbury
ATTORNEYS

Feb. 9, 1971  S. MINUNNO  3,561,200
POWER OPERATED GRASS TRIMMER
Filed June 11, 1968
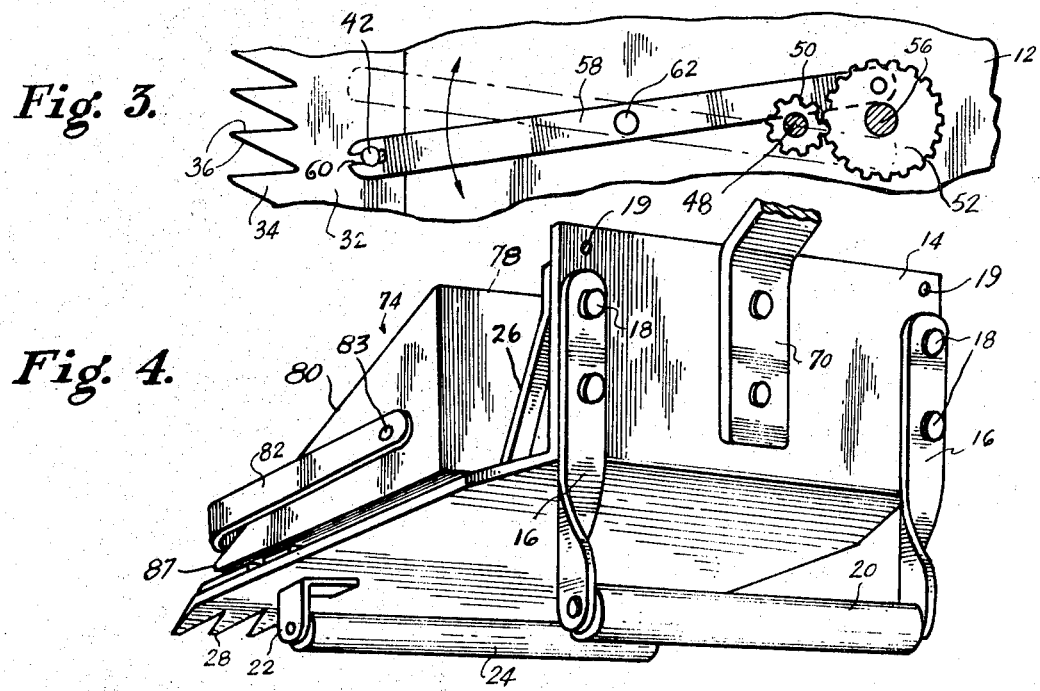
Fig. 3.
Fig. 4.
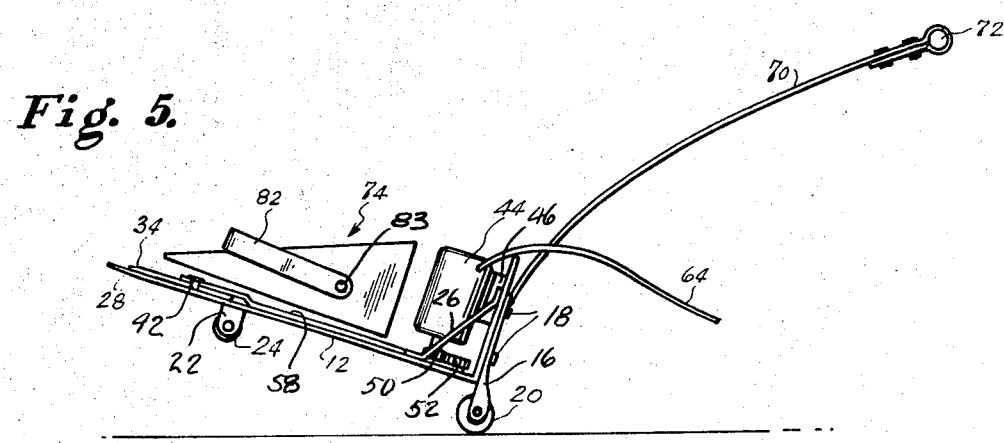
Fig. 5.
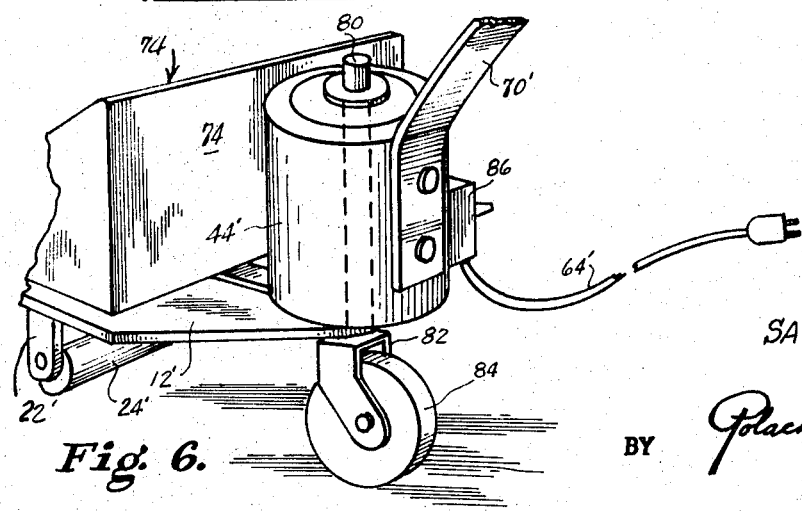
Fig. 6.
INVENTOR
SAVERIO MINUNNO
BY
ATTORNEYS

INVENTOR
SAVERIO MINUNNO

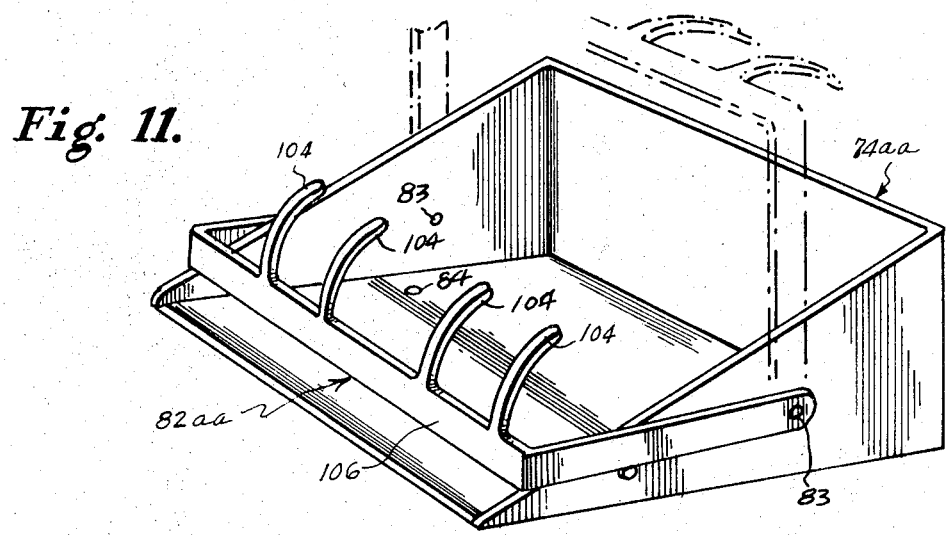
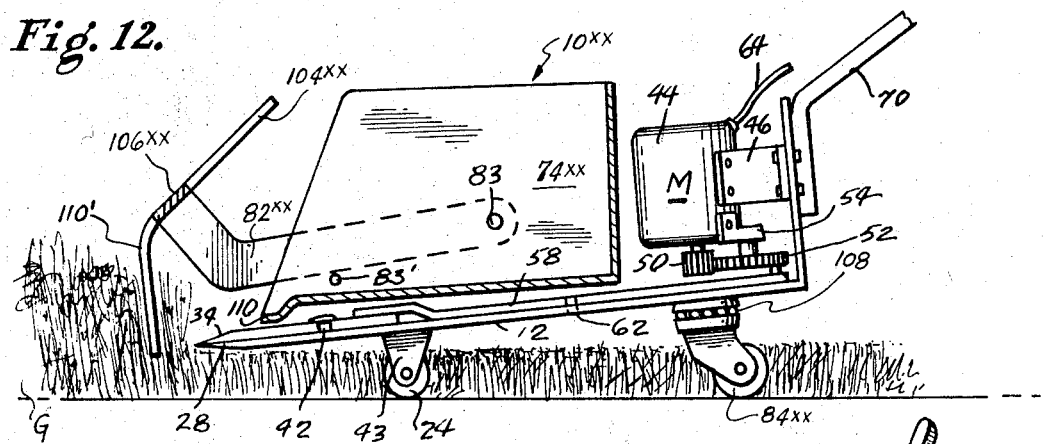
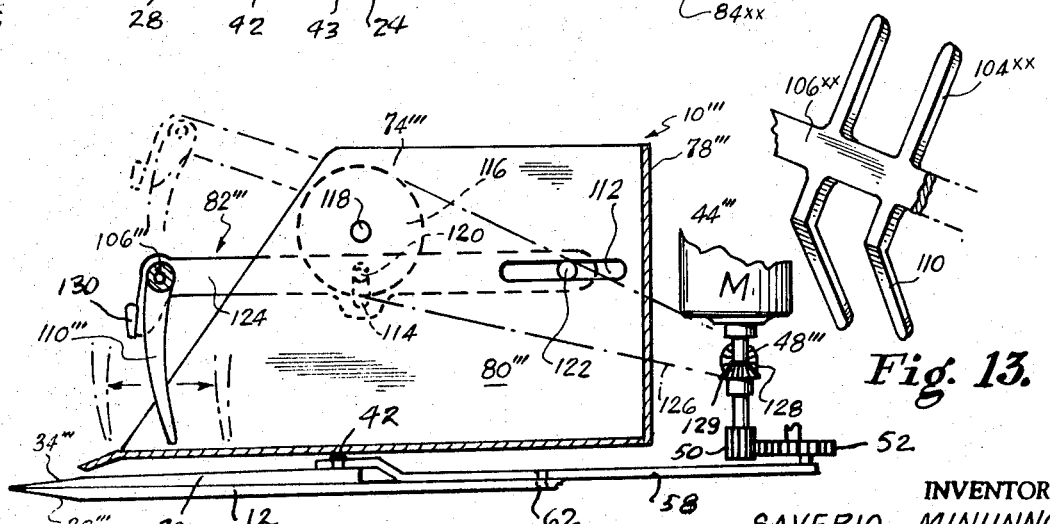

INVENTOR
SAVERIO MINUNNO

United States Patent Office 3,561,200
Patented Feb. 9, 1971

3,561,200
POWER OPERATED GRASS TRIMMER
Saverio Minunno, 4205 New Utrecht Ave.,
Brooklyn, N.Y. 11219
Filed June 11, 1968, Ser. No. 736,155
Int. Cl. A01d 53/06
U.S. Cl. 56—201                                          4 Claims

ABSTRACT OF THE DISCLOSURE

A power operated grass trimmer or lawn mower that is simple, compact and well balanced and capable of being operated with a minimum of fatigue. The trimmer is equipped with a rectangular shaped stationary comb plate with cutting teeth and with a movable cutter blade or plate reciprocable across the cutting teeth of the comb plate to provide a double cutting action during its back and forth movements. A removable box with a U-shaped handle is provided for receiving and disposing of the cut grass. The mower can be tilted upon one of its roller supports by depressing or lifting the handle to vary the height of cut of the grass. One of the supporting rollers can be driven by the motor that operates the cutter blade.

---

This invention relates to new and useful improvements in power-operated shears for cutting and trimming lawns and more particularly to support and power means therefor.

The cutting or trimming of grass on lawns is usually performed with garden shears actuated by hand and is laborious and slow. In some instances, power is applied to the cutting or trimming device which is made somewhat on the line of a modified lawn mower with blades rotatable about either horizontal or vertical axes. Such devices are cumbersome, expensive and hard to work or manipulate. In the instant invention, the device is simple, compact and balanced so as to be capable of manipulation with minimum fatigue. It is operated by a small motor, electric or gas engine, and made so light, convenient and compact that it can be manipulated by the use of a single hand of an operator and adjustable to any height of cut and the ease of cutting being the same regardless of the height adjustment.

An important object of the invention is to provide a lawn trimmer equipped with a stationary platform blade and a laterally movable cutting blade mounted in shearing operation with the stationary blade to move across the inner cutting edges of the stationary blade to provide a double cutting action for the movable blade during its back and forth movement.

Another object of the invention is to provide a new and improved lawn trimmer to cut the grass as it rolls along the ground, by pushing or by power, and which has a motor incorporated in its structure capable of performing this type of work rapidly and effectively, without in effect adding to its weight to any substantial extent or making the apparatus cumbersome.

Still another object of the invention is to provide roller support means so disposed under the platform as to permit the mower to be balanced upon the same when in use thereby to render the mower easy to push or drive or be tilted to alter the height of cut of the grass.

A further object of the invention is to provide a lawn trimmer of this character with means incorporated in the structure thereof for positioning a removable box so that the cut grass falls thereinto for disposal purposes.

A still further object of the invention is to provide a lawn trimmer of this character with stationary and movable cutting teeth so shaped and arranged that they tend to sweep the material cut toward a removable box mounted on the structure during the cutting operation.

In the drawings:

FIG. 3 is a fragmentary top plan view of the drive for the reciprocal blades.

FIG. 4 is a side, rear and bottom perspective view thereof with the handle being broken away.

FIG. 5 is a reduced side elevational view of the entire mower in tilted position upon its rear roller support.

FIG. 6 is a fragmentary rear perspective view of a modified form of the invention, employing a dirigible rear wheel support with its vertical shaft shank extending upwardly through the drive motor to centralize the weight thereof.

FIG. 11 is a top perspective view of a modified form of box for receiving and disposing of the cut grass with a handle having rearwardly curved finger to hold the grass in the box.

FIG. 12 is a side elevational view of a further modified form of the invention showing a box with a still different handle in section.

FIG. 13 is a fragmentary perspective view of the different handle of the disposal box with downwardly extending fingers.

FIG. 14 is a longitudinal sectional view of a still further modified form of the invention having a rake replacing the handle of the box and driven by the motor to pull the grass into the box.

Figures 1, 2:
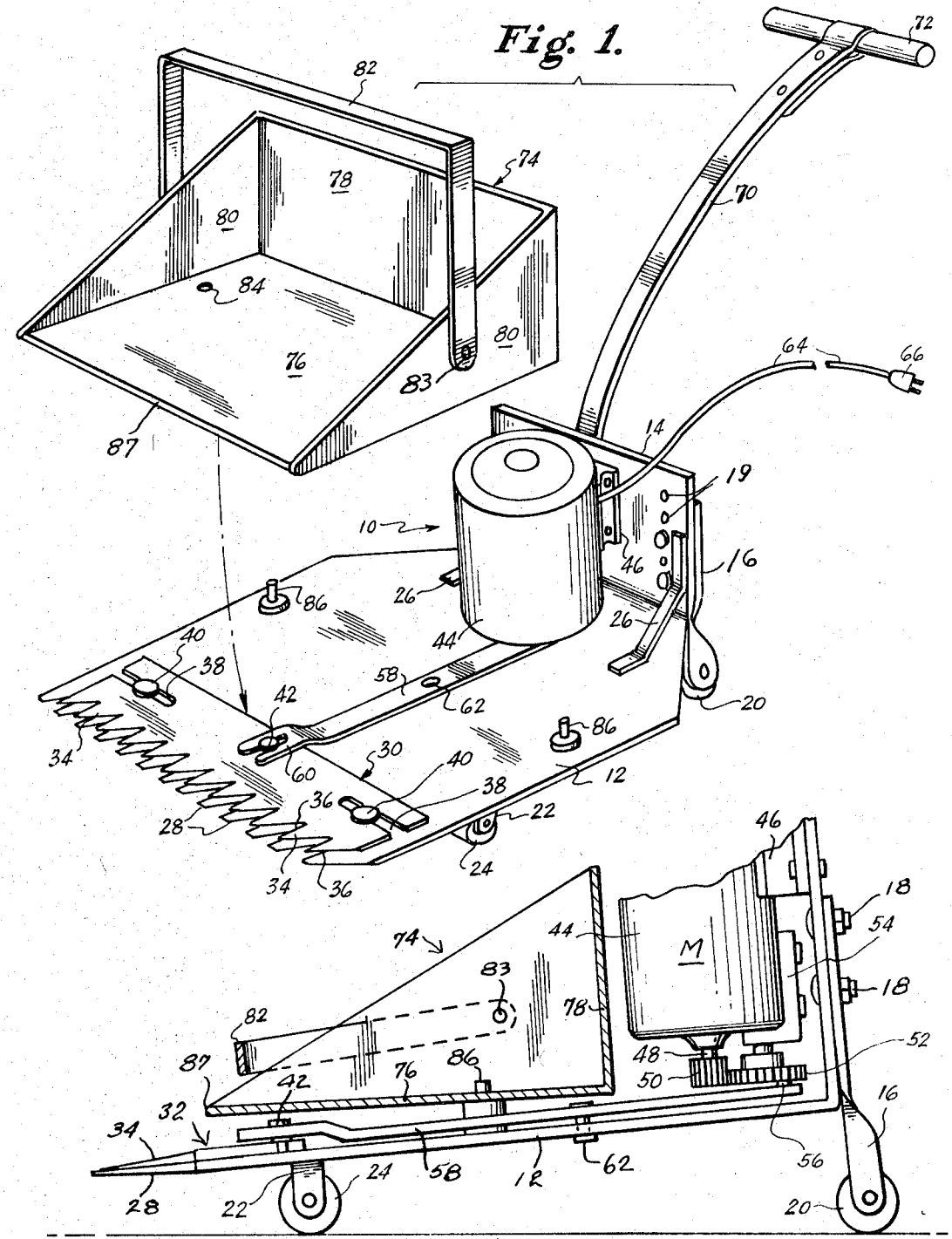
FIG. 1 is a perspective view of a lawn trimmer according to one form of the invention, the box for receiving and disposing of the grass being shown in detached position.
FIG. 2 is a fragmentary side elevational view thereof, with grass receiving box being shown in section.

Referring in detail to FIGS. 1 to 5, a lawn trimmer embodying one form of the invention is shown and designated generally at 10. The lawn trimmer 10 comprises a rectangular shaped metal comb platform 12 formed integrally with an upright plate 14 at its rear. A pair of brackets 16, 16 secured to the rear surface of the rear plate by pairs of bolts 18 entering adjusting holes 19, depend below the bottom of the rear plate and supports a laterally-extending supporting roller 20. A pair of L-shaped brackets 22 are secured to the bottom surface of the comb platform 12 near the front thereof and support another supporting roller 24 in parallel relationship thereto. A pair of braces 26, 26 is secured at one end to the top surface of the comb plate 12 and at their upper end to the rear plate 14.

The comb platform 12 is formed with a series of spaced apart, forwardly projecting finger-like cutting teeth 28. A laterally-movable cutter or blade 30 in the form of a rectangular-shaped plate with a series of cutting teeth 34 along one long forward edge thereof, reciprocates over the top surface of the comb platform. The teeth 34 have both their sides edges sharpened as at 36 and the teeth 28 are correspondingly sharpened to cooperate with the respective teeth 28 of blade 30. The blade 32 is formed with slots 38 intersecting the ends thereof. Headed pins 40 extending upwardly from the comb platform 12 and passing through the slots 38 guide the movements of the cutter blade 30. A headed pin 42 extends upwardly from the cutter midway its ends and adjacent to long rear edge. The drive mechanism for the cutter plate 30 includes an electric motor 44 supported on the rear plate 14 by a bracket 46. A drive shaft 48 extends from the bottom of the motor and mounts a broad faced pinion 50. A gear 52 serving as a crank is carried by a bracket 54 fixed on the motor housing and meshes with the pinion 50. A pin 56 is fixed at one end on the gear 52 eccentrically of the axis of the gear, the other end of the pin being fixed on the adjacent end of an elongated bar 58 extending under the motor and forwardly to the cutter plate 30 where its bifurcated end 60 engages the pin 42 on the cutter plate 32. The bar 58 pivots on a pin 62 extending upwardly from the center of the comb platform 12 midway its ends. The motor is fed through a cable 64 passing to it in a conventional manner, which cable is provided with a plug 66 for connection to a suitable source of electric motive power. A long upwardly and rearwardly curved handle 70 is attached at one end to the rear plate 14, its other end being provided with a cross handle bar 72.

The invention contemplates a removable grass collecting box 74 for receiving and disposing of the cut grass. This box as best seen in FIG. 1 has a bottom wall 76. An upstanding rear wall 78 and tapered side walls 80, 80, the front of the box and the top thereof being open. A U-shaped handle 82 has its ends pivoted to the side walls 80 at 83. The bottom wall 76 is formed with opposed holes 84 adjacent to and midway the ends of the side walls. The comb platform 12 is provided with a pair of upstanding spaced apart pins 86 adapted to receive the holes 84 in the bottom wall 76 of the box for positioning the box for proper seating on the comb platform 12 with its forward edge 87 adjacent the base of the cutting teeth as shown in FIG. 2.

In the operation of the apparatus, the user holding the handle 70 places the comb platform 12 close to the grass to be trimmed either on both rollers or tilted onto one of the rollers, with the box 74 in position thereon and starts the motor by plugging into a source of electrical energy whereupon the teeth 34 of the cutter plate 30 oscillates across the teeth 28 of the comb platform and cuts grass collected between the teeth. The mower is rolled along on the rollers 20 and/or 24 and the cut grass is thrown upwardly and rearwardly into the box 74. The box is readily removed from the comb platform for disposal of the cut grass. The mower is readily tilted rearwardly on roller 20 for transporting the mower or for cutting the grass higher.

In the modified form of the invention shown in FIG. 6 the plate 14 and a rear roller 20 of the mower 10 of FIG. 1 have been omitted and a motor 44' is mounted directly upon the tapered rear end of the comb platform 12'. A handle 70' is attached directly to the housing of the motor 44'. In place of the rear roller 20, a shaft 80 extends through the axial center of the motor 44' above the motor housing and casters therein. An inverted U-shaped bracket 82 is fixed to the bottom end of the shaft 80 for supporting a dirigible caster wheel 84. This mover rolls on the caster wheel 84 and a front roller 24', carried on brackets 22'. In this form, the cable 64' is connected at one end to a switch box 86 mounted on the motor housing.

Figure 7:
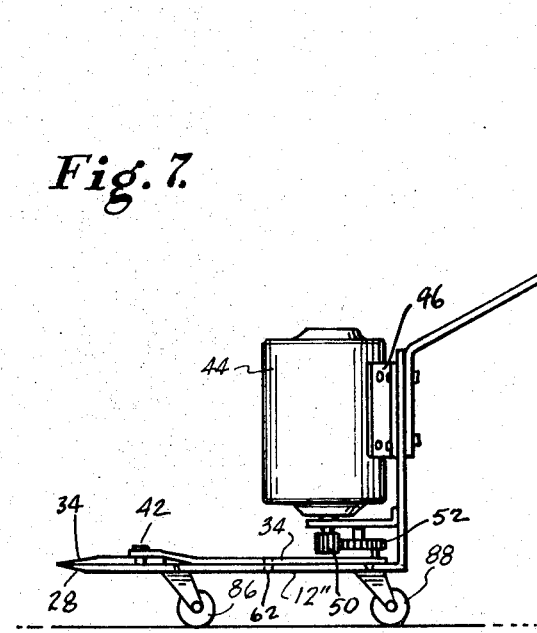
FIG. 7 is a side elevational view of another modified form of the invention that is supported upon four small rollers arranged in pairs.
Figure 8:
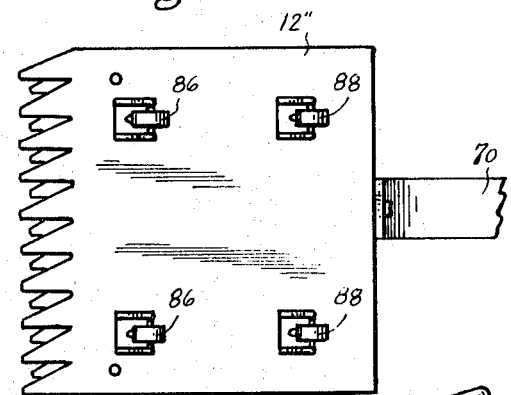
FIG. 8 is a bottom plan view thereof.

FIGS. 7 and 8 illustrate a modified means for mounting a comb platform 12". In this form, the parallel front and rear rollers 24 and 20 of FIG. 1 are omitted, and in their place there is provided a front pair of caster wheels 86 and a rear pair of caster wheels 88, secured to the bottom surface of the comb plate 12". This arrangement of supporting wheels eases the steering of the mower.

Figure 9:
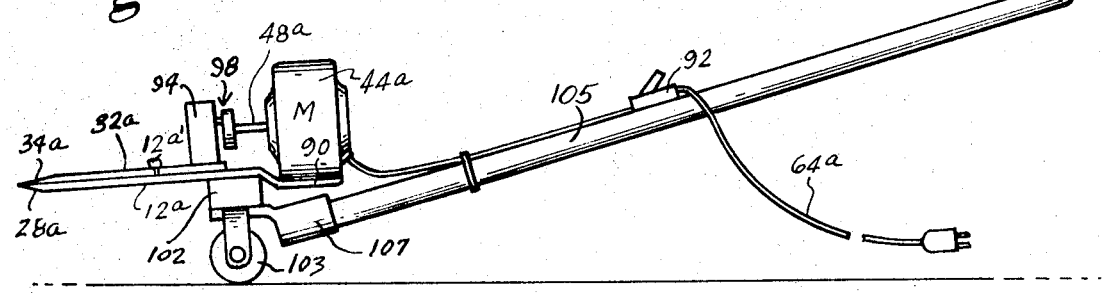
FIG. 9 is a side elevational view of still another modified form of the invention, with a single roller support and a horizontal motor drive shaft.
Figure 10:
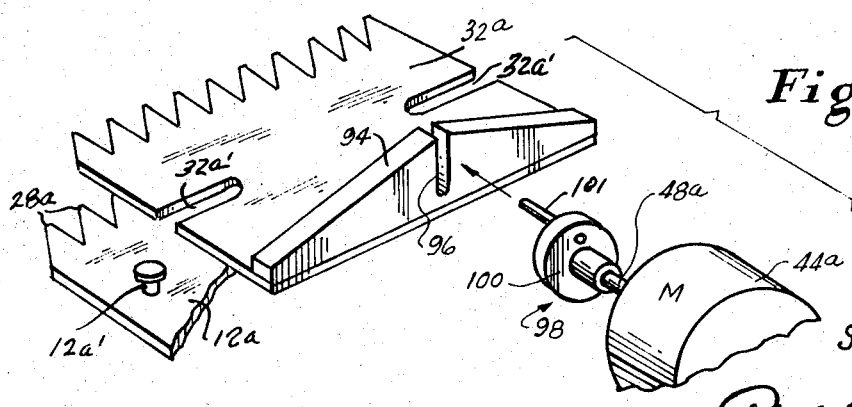
FIG. 10 is an exploded and fragmentary top plan view of the drive for the laterally movable blade thereof.

Referring now to the modification of the invention shown in FIGS. 9 and 10, a motor 44a is mounted on a rear offset portion 90 of the comb platform 12a and is disposed horizontally with its drive shaft 48a extending horizontally. One end of cable 64a passes through a switch box 92 and is connected to the rear of the motor, the switch controlling the flow of current to the motor 44a. The platform cutter 12a has teeth 28a and the laterally-extending cutter plate 32 operates thereover for shearing action. The rear end of the cutter plate has an upright tapered plate 94 with a slot 96 formed in the center thereof. A crank device 98 formed of a disk 100 and a pin 101, is fixed on the end of the motor drive shaft 48a. The pin 101 extends forwardly from the disk offset from its center and into the slot 96 in the plate 94 for reciprocating the cutter plate 32a and its teeth 34a operable over the teeth 28a of platform 12a to effect shearing action. The plate 32a has slots 32a' that extend over guide pins 120' extending up from the platform 12a. The platform 12a is supported at its rear end from a depending bracket 102 and a large roller 103. An operating handle 15 is fixed to a sleeve 107 rigidly extending rearwardly from bracket 102. By this handle 105 the mower is pushed and tilted to vary the height to which the grass is cut.

FIG. 11 illustrates a modified form of box 74aa for disposing of the cut grass. Box 74aa differs from box 74 in that the U-shaped handle 82aa is formed with pairs of upwardly and rearwardly curved fingers 104 along one long edge of the bight portion 106 thereof for better retaining the grass in the box 74aa.

In the modified form of lawn trimmer 10xx shown in FIGS. 12 and 13, a swivel caster wheel 84xx takes the place of the rear roller 20 of the grass trimmer 10 of FIG. 1. The caster wheel 84xx is provided with ball bearings 108.

Herein the box 74xx is formed with a downwardly curved front edge 110 and the U-shaped handle 82xx is formed with an offset bight portion 106xx carrying pairs of upper extending fingers 104xx and bent lower extending fingers 110'. The lower fingers 110' are adapted to extend into the grass G and deflect the cut grass upwardly and rearwardly into the box as well as straighten the grass prior to cutting action. The straight upper fingers 104xx hold the grass in the box as do the fingers 104 of the box handle 82aa of FIG. 11. A stop pin 83' in the side of the box 74xx holds the handle in its forward and lowered position.

In the modified form of lawn trimmer 10''' shown in FIG. 14, the U-shaped rake 82''' is reciprocably mounted on the box 74''' so as to effect raking action and pull in the grass as fingers 110''' carried by the bight portion 106''' of the rake are raised and lowered over cutting teeth 28''' and 34'''. For this purpose, one side wall 80''' of the box is formed with a horizontally-disposed elongated closed slot 112 adjacent rear wall 78''' thereof, and with a vertically-disposed elongated closed slot 114 in the leg portion 124 of rake 82''' forwardly of slot 112. A sprocket wheel 116 is rotatably mounted on a stub shaft 118 in said one side wall 80''' of the box and has a radially-projecting pin 120 adjacent the periphery thereof extending through the vertically disposed slot 114 in the leg portion 124 of the U-shaped rake 82'''. A pivot pin 122 on the rear end of leg portion 124 extends into horizontal slot 112 of the same side wall. An endless chain 126 is trained around the sprocket wheel 116 and around a bevel gear-sprocket 128 meshed with bevel gear 129 on the motor drive shaft 48'''. When the motor 44''' is energized, the sprocket wheel 116 is turned and by means of pin 120 moves the U-shaped rake 82''' upwardly and downwardly and back and forth carrying the fingers 110''' toward and away from the cutting teeth. The fingers 110''' are respectively pivotally connected to bight portion 106''' and are retained against forward movement by depending stops 130. A stone or any large debris can pass the fingers 110''' because they have free rearward pivotal movement.

Figure 15:
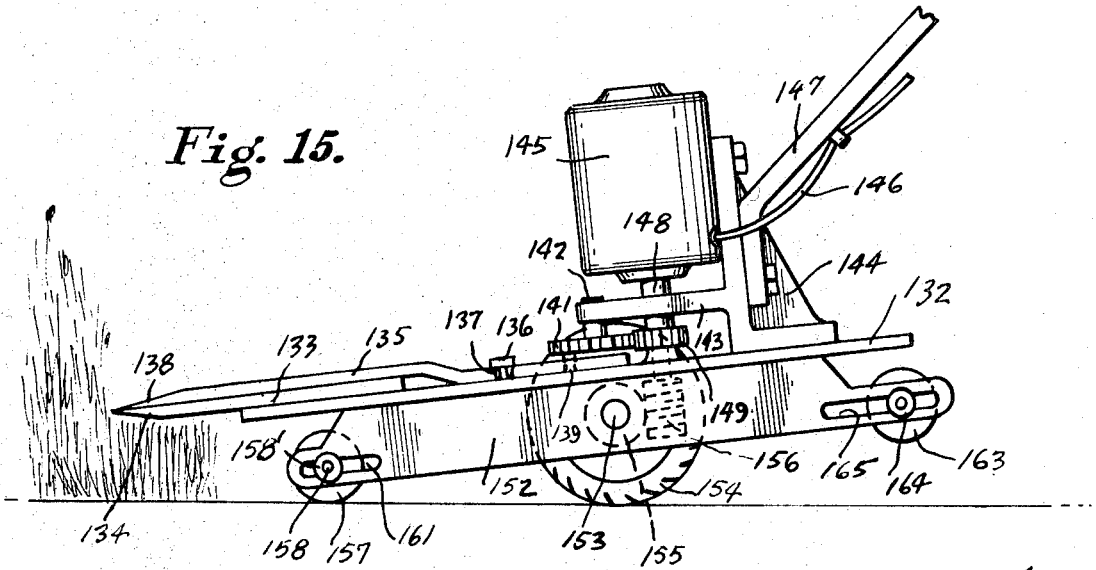
FIG. 15 is a side elevational view of a still further modified form of the invention in which the platform is tiltably supported upon a motor driven roller and tilted to be supported on a front roller for short cutting of the grass.
Figure 16:
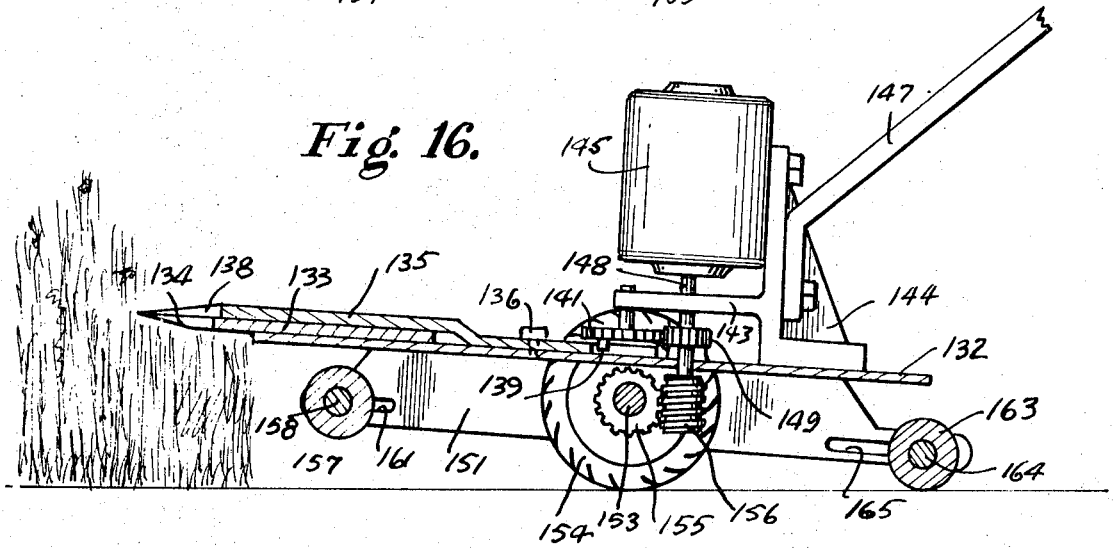
FIG. 16 is a similar and sectional view but tilted onto a rear roller for high cutting of grass.
Figure 17:
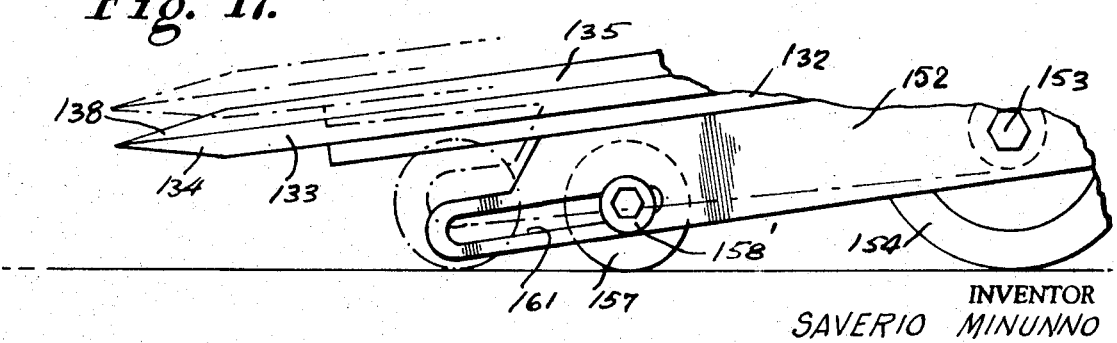
FIG. 17 is an enlarged fragmentary side elevational view of the front of the mower illustrating the manner in which the front support roller can be adjusted rearwardly to shorten the cut.

In FIGS. 15 to 17, there is shown a platform 132 having a forwardly-extending stationary cutter plate 133 having cutting fingers 134 and laterally movable across the stationary cutting plate 133 is a top cutting plate 135 guided by pins 136 projecting upwardly from the platform 132 through guide slots 137 at the sides of the plate 135. Plate 135 has cutting fingers 138 which cooperate for cutting action with fingers 134 of stationary cutting plate 133.

The top cutting plate 135 is activated from a crank pin 139 depending from a gear 141 on a shaft 142 journalled in a bracket portion 143 extending forwardly from an upstanding motor supporting bracket 144 on the rear of platform 132. The bracket 144 supports electric motor 145 from which extends an electric supply cable 146 and an upwardly and rearwardly inclined push handle 147. Motor 145 has a shaft 148 that depends through bracket portion 143 and has a gear 149 meshing with the cutter plate operating gear 141 to drive the same.

Depending from the sides of the platform 132 are side walls 151 and 152 between which extends a drive shaft 153 to which large ground supporting wheels 154 are fixed in spaced relation. The shaft 153 has a gear wheel 155 fixed thereto that meshes with a worm 156 on the depending lower end of motor shaft 148 so that the mower will be driven over the ground by the motor 145, the same motor that drives the cutter plate 135. The weight is distributed throughout the mower so that the mower can be balanced or easily tilted upon the supporting drive wheels 154. By this means the depth of cut of the grass or the height to which it is desired to cut can be determined by either tilting the mower forwardly or rearwardly.

In order to determine the low cutting depth a forward supporting roller 157 is journalled on a shaft 158 that can be fastened at its ends by clamp nuts 158' or any suitable means at longitudinally-disposed positions within slots 161 in the forward ends of the depending side walls 151 and 152. If a low cutting depth or short cut of the grass is desired the roller through its shaft will be fixed in a rearmost position in the slots 161 but if a slightly higher cut of grass is desired the roller will be positioned in the forward ends of the slots 161.

If it is desired to have a much higher cut of the grass the mower is pivoted on the wheels 154 rearwardly and supported on a rear roller 163 secured for pivotal rotation on shaft 164 having means for adjustably retaining the roller 163 in longitudinal slots 165 forwardly or rearwardly depending upon the size of higher cut that is desired.

Once the front and rear rollers 157 and 163 have been fixed it is merely a matter of tilting the mower on the wheels 154 to obtain either a short cut of the grass as by lifting up on the handle or a long cut of the grass as by depressing the handle and dropping the mower upon the rear roller 163. With the one motor, both the cutting action and the driving of the motor over the ground is thus effected.

While I have illustrated and described the preferred embodiments of my invention it is to be understood that I do not limit myself to the precise construction herein disclosed and that various changes and modifications may be made within the scope of the invention as defined in the appended claims.

I claim:

1. A power-operated grass trimmer, comprising a fixed comb platform with cutting teeth, along the form and edge thereof, a reciprocable cutter plate with other cutting teeth along the forward edge thereof and movably supported on the comb platform adjacent to the first named cutting teeth thereon, a power unit for reciprocating the cutter plate and including a rotatable eccentric crank, an elongated bar pivoted upon the comb platform and having one end connected to said crank and its other end connected to the reciprocable cutter plate for moving the teeth of said cutter plate across the teeth of said first fixed comb platform, roll support means depending below the comb platform for transporting the grass trimmer, a push handle extending upwardly from the comb platform, a box removably mounted on the platform, said box having a bottom wall, vertical side walls and a rear wall integral with the bottom wall, and an open top and front end to admit cut grass into the box, support means on the platform removably supporting the box with said bottom wall spaced from the cutter plate and elongated bar, a rectangular U-shaped handle having sides pivotally mounted on said side walls of the box to hold the box in balanced position when the box is removed from the platform loaded with cut grass, said U-shaped handle having a straight bight portion disposable forwardly adjacent the open end of the box to define an opening with the bottom wall for guiding cut grass through said opening into the box and to prevent scattering of cut grass out of the box, and spaced fingers on said bight portion arranged to depend therefrom forwardly of said cutter plate to lift the grass prior to being cut by said cutter plate.

2. A power-operated grass trimmer as defined in claim 1, wherein the U-shaped handle for the box has other spaced fingers radiating upwardly from the bight portion thereof to cooperate therewith in retaining cut grass in the box.

3. A power-operated grass trimmer as defined in claim 1, further comprising means slidably and pivotally supporting the U-shaped handle upon the box for moving said fingers toward and away from the cutting teeth on the comb platform and cutter plate to effect a raking action of the grass into the box.

4. A power-operated grass trimmer as defined in claim 3, wherein the last named means comprises elongated horizontally disposed slots in the side walls of the box, and pins on the sides of the U-shaped handle pivotally and slidably engaged in said slots; a sprocket wheel rotatably mounted on one side wall of the box, a pin carried by said wheel adjacent to the periphery thereof, one leg of the handle having a vertically disposed slot receiving the pin on the wheel, drive means operatively connecting the sprocket wheel with the power unit to turn the wheel and reciprocate the handle fore and aft, said fingers on the bight portion being adapted to pivot freely rearwardly to permit the box to pick up stones and large debris; and stop means on the bight portion to limit forward pivotal movement of said fingers.

References Cited
UNITED STATES PATENTS

| | | | |
|---|---|---|---|
| 391,069 | 10/1888 | Parham | 56—201 |
| 623,040 | 4/1899 | Sather | 56—201 |
| 911,719 | 2/1909 | Hake | 56—201 |
| 1,122,984 | 12/1914 | Murdick | 56—201X |
| 1,473,572 | 11/1923 | Fitzgerald | 56—400.11UX |
| 1,614,386 | 1/1927 | Peebles et al. | 56—26.5X |
| 1,770,091 | 7/1930 | Soss | 56—26.5 |
| 2,251,637 | 8/1941 | Ronning | 56—26.5 |

(Other references on following page)